Feb. 15, 1966 K. V. BECKER ETAL 3,234,574
BACKPART MOLDING MACHINES
Filed Feb. 17, 1964 4 Sheets-Sheet 1
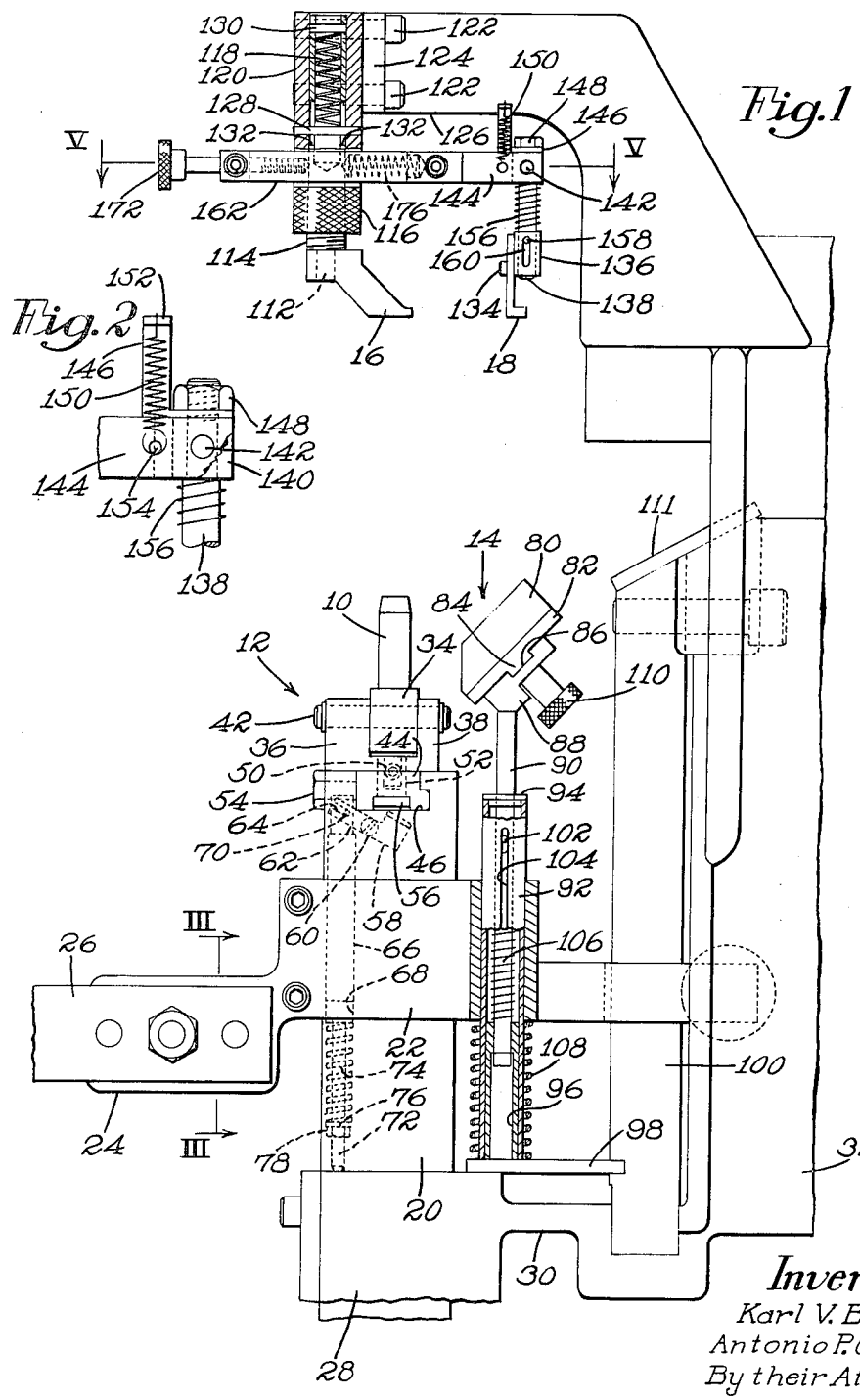
Inventors
Karl V. Becker
Antonio P. Charron
By their Attorney

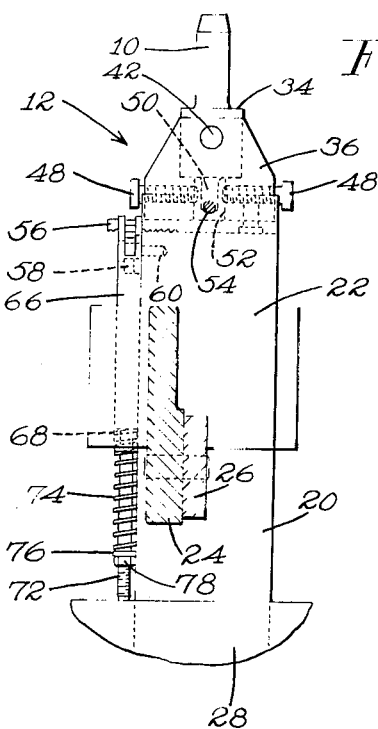
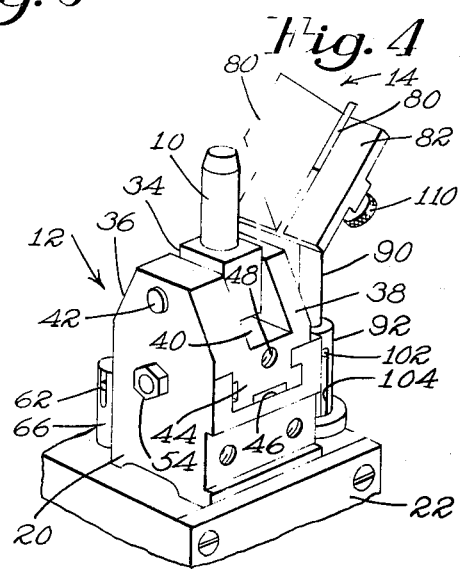
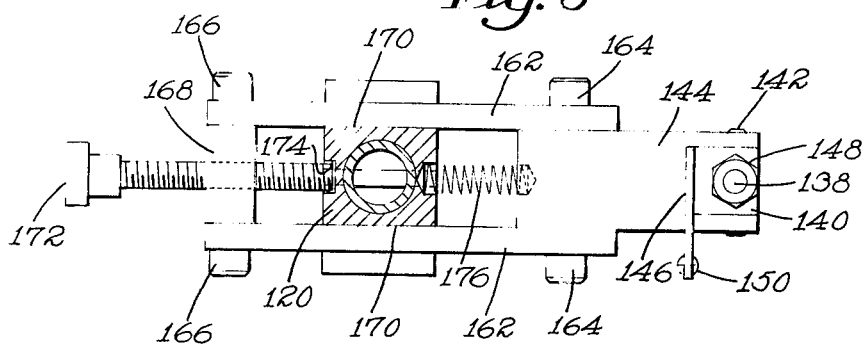

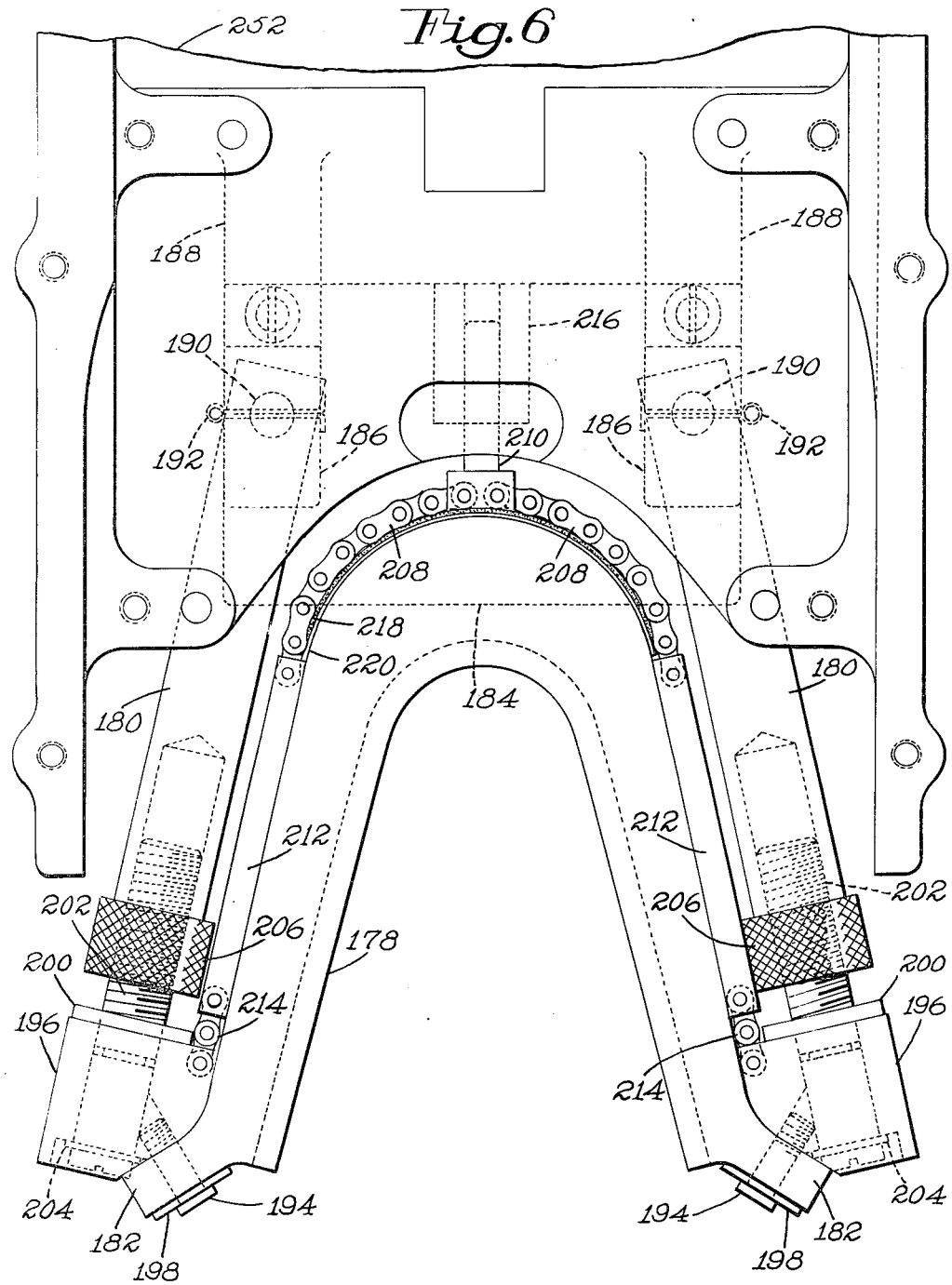

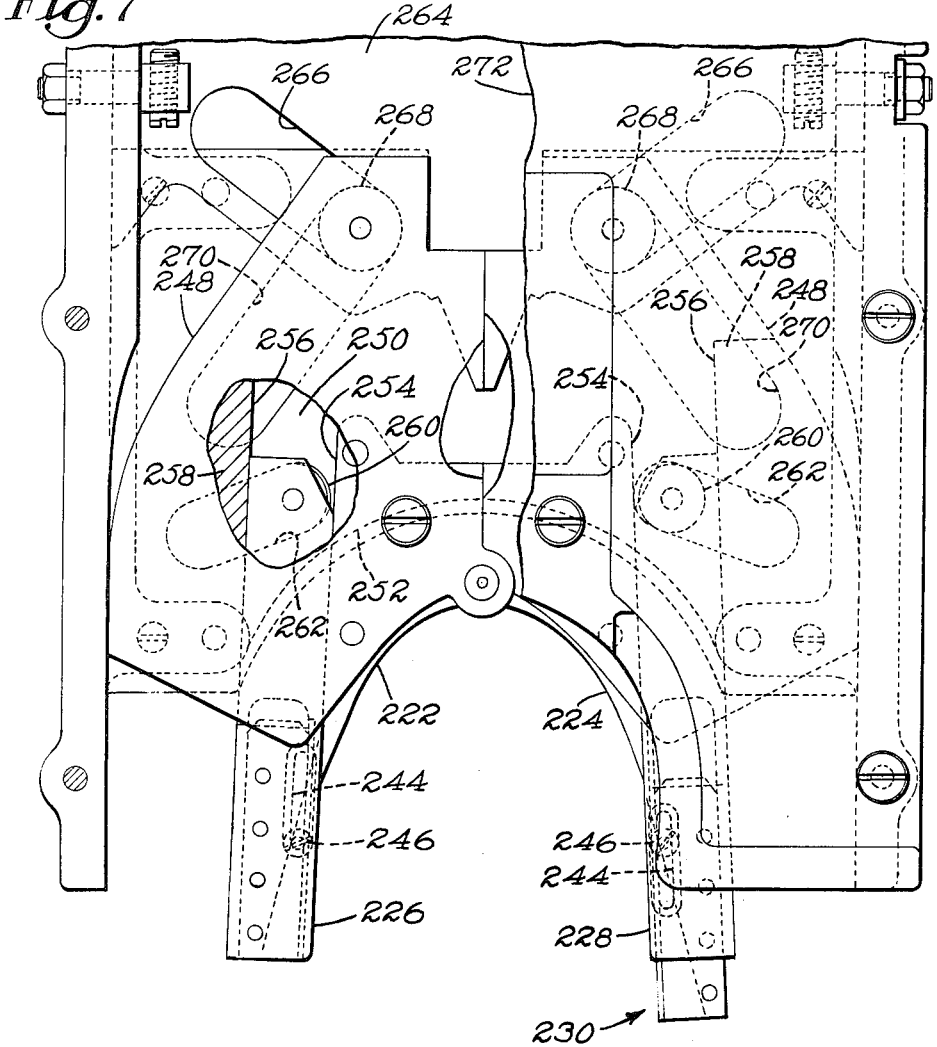
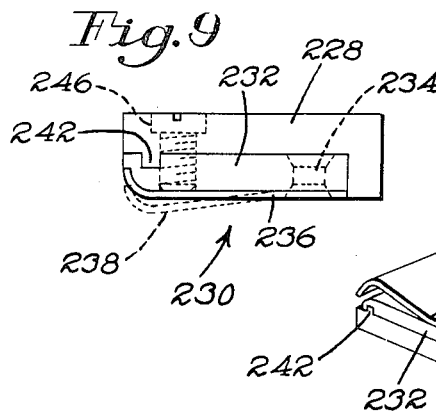
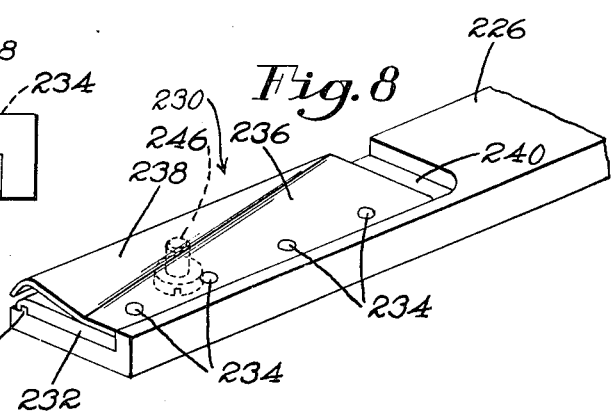

United States Patent Office 3,234,574
Patented Feb. 15, 1966

3,234,574
BACKPART MOLDING MACHINES
Karl V. Becker, Boxford, and Antonio P. Charron, Beverly, Mass., assignors to United Shoe Machinery Corporation, Boston, Mass., a corporation of New Jersey
Filed Feb. 17, 1964, Ser. No. 345,377
20 Claims. (Cl. 12—12)

This invention relates to shoe machines and is herein illustrated and described in its application to machines for shaping the heel ends of shoe uppers upon their lasts. Machines of this type are disclosed, for example, in United States Letters Patent No. 3,096,531, granted July 9, 1963 on an application filed in the name of Adelbert W. Rockwell, Jr., and in an application for United States Letters Patent Serial No. 168,918, filed January 26, 1962 in the name of Karl V. Becker, now U.S. Letters Patent No. 3,138,810 issued June 30, 1964.

It is an object of the present invention to improve machines of the type above referred to with a view to facilitating the accurate location of lasts relatively to the operating instrumentalities of the machine. Further objects of the invention are to provide improved upper shaping means and in general to provide an improved organization which facilitates the handling of last and shoe upper parts with a view to substantially increasing the productive capacity of the machine.

With the above and other objects in view, as will hereinafter appear, the present invention in one aspect thereof contemplates the provision in a machine of the type above referred to of a last supporting jack which moves from a loading station to an operating station and carries a last pin which in the loading station is freely movable angularly on an axis extending generally lengthwise of the heel portion of a last on the last pin and is freely movable bodily widthwise of the last thus to permit a proper positioning of the last for the operations to be performed by the machine. During the movement of the jack to the operating station the last pin is locked in its adjusted position widthwise of the last in order to prevent accidental misplacement thereof.

In order to assist the operator in determining the orientation of a last on the last pin the present invention provides a last locating member which engages the extremity of the heel portion of the last. In order to provide clearance for the subsequent operation of a heel band the last locating member after performing its function moves from its operating position into a position in which it is offset from the heel end portion of the last. In accordance with a further feature of the invention the last locating member is in the form of a horn within which the extremity of the heel portion of the last is received. The horn is mounted on a head for adjustive movement widthwise of the last and the head has a stem depending therefrom into a hollow supporting member. Suitable means is provided for urging the stem heightwise of the last to bring the horn into engagement with the heel end portion of the last and means is provided for urging the supporting member heightwise of the last in a direction to transfer the horn from its operating position into an offset position in which it affords clearance for the operation of the heel band.

In order to determine the position of the jack in the operating station of the machine the present invention provides means for positively arresting movement of the jack from the loading station to the operating station, and provides, in combination with said arresting means, means for yieldingly pressing against the last bottom an insole mounted thereon. In order to obviate interference between the pressing means and the lasting wipers suitable means is provided for mounting the insole pressing means for displacement by the wipers during their operating movement. In accordance with a further feature of the invention the jack arresting means is mounted in a fixture which carries an arm on which the insole presser member is mounted and suitable means is provided for adjusting the arm lengthwise of the last in order to locate the insole presser member accurately relatively to the margin of the insole.

In order to improve the operation of the heel band upon opposite sides of the heel portions of shoe upper parts mounted upon a last the heel band is provided with a backing means which comprises a flexible means for backing the curved extremity of the heel band and inflexible means for backing the rectilinear side portions of the heel band and for causing the application of uniform pressure along the opposite sides of the heel portions of the shoe upper parts. The flexible backing means and the inflexible members are suitably connected to provide a unitary backing structure which is carried by a pair of arms mounted in the heel band carriage. In the illustrated organization these are the same arms which carry the heel band.

In order to improve the wiping of the lasting margins of the shoe upper parts inwardly over the heel portion of an insole on a last bottom the present invention provides improved wiping means comprising a pair of mutually articulated end wipers for wiping the marginal materials inwardly over the curved extremity of the heel portion of the insole, means on which the wipers are carried, a pair of rectilinear side wipers mounted on the carrying means and arranged to overwipe the lasting margins at opposite sides of the heel portion of the insole, means substantially limiting the side wipers to movements widthwise only of the last and resilient wiping elements carried by the side wipers whereby said side wipers operate in a plane displaced heightwise of the last from the plane of operation on the end wipers. Thus the side wipers are able to accommodate themselves to differences of thickness of overlasted substances caused by the occurrence of pleats at the curved extremity of the heel portions of the upper materials and the absence of such pleats at opposite sides of the heel portion thus causing the end wipers to operate in a plane slightly elevated above the plane of operation of the side wipers. The differential will vary with different thicknesses of upper materials and the resilience of the wiping elements carried by the side wipers will accommodate such variations.

These and other features of the invention will now be described with reference to the accompanying drawings and pointed out in the appended claims.

In the drawings:

FIG. 1 is a right side elevation, partly in section, illustrating portions of a machine embodying the features of the present invention;

FIG. 2 is an enlarged view in right side elevation illustrating the features of the insole holddown mechanism illustrated in FIG. 1;

FIG. 3 is a front elevation of the upper portion of the shoe supporting jack partly in section on the line III—III of FIG. 1;

FIG. 4 is a perspective view illustrating the shoe supporting jack shown in FIG. 3 together with a last positioning device;

FIG. 5 is an enlarged plan view partly in section on the line V—V of FIG. 1;

FIG. 6 is an enlarged plan view illustrating the heel band assembly;

FIG. 7 is a plan view illustrating mainly the wiper assembly;

FIG. 8 is an enlarged perspective view illustrating in inverted position a side wiper shown in FIG. 7; and FIG. 9 is an end view of the side wiper shown in FIG. 8.

This invention is herein illustrated and described as embodied in a three station machine for shaping or molding the heel end portions of shoe upper materials on their lasts, the illustrated machine being of the type disclosed in the Rockwell Patent No. 3,096,531 and the Becker patent No. 3,138,810, each hereinbefore referred to. Machines of this type have a central station in which the heel portions of the upper materials are conditioned for the molding operation by the application of steam thereto and two duplicate side stations each having a jack for supporting a last on which shoe upper parts are loosely mounted, the jack being movable vertically to bring an insole on the last bottom into engagement with an arresting means which locates the last and the upper materials thereon in the operating station. For molding the heel end portions of the upper materials to the shape of the last, each side station has a heel band mounted on a suitable carrier which first advances the band into engagement with the back line portion of the upper and then closes the band on the upper while concomitantly the side portions of the band advance toewardly to stretch the heel end portion of the upper about the last and mold it thereto. The operation of the band is followed by the operation of an assembly of heel end wipers which wipes the lasting margins of the upper materials inwardly over the heel end portion of the insole. Preferably, the lasting margins of the shoe upper materials and the margin of the insole will have been coated with a suitable adhesive for attaching the upper materials to the insole in their overlasted position.

Referring to FIG. 1 which illustrates the work supporting and other mechanisms in one of two side stations of the machine a last pin 10 is arranged to receive the heel end portion of an inverted shoe last having shoe upper parts assembled thereon and a toe rest (not shown) is arranged to receive and support the toe portion. The last pin is incorporated in an assembly 12 for adjustive movement widthwise of a last mounted thereon, the last pin being mounted for limited angular adjustive movement about an axis extending generally lengthwise of the last. For determining the position widthwise thereof of a last mounted on the last pin 10 a last locating member herein illustrated as a horn 14 is arranged to receive and embrace the back line portion of a last on the last pin 10 or more specifically that portion of the upper materials on the last at the junction of the back line and the plane cone face of the last. In the operation of the machine the last pin assembly moves upwardly to bring an insole on the last bottom into engagement with an arresting means comprising a foot 16 which, in the illustrated organization, is combined with a holddown or presser member in the form of an angle plate 18 constructed and arranged to engage the margin of the insole at the extremity of its heel end portion. The last pin assembly is carried at the upper end of a vertical jack member 20 which is substantially square in cross section. Mounted on the jack member for vertical adjustive movement relatively thereto is a hollow head 22 which is clamped to the jack member and has incorporated therein a forwardly extending arm 24 to which there is secured the rear portion of an arm 26 which carries at its forward extremity a suitable support for the toe portion of a last mounted on the last pin 10. The jack member 20 is mounted for vertical movement in a channel structure 28 connected by means including an integral bridge section 30 to a frame member 32. The frame member 32 is secured to a side wall of a cabinet (not shown) which forms the base portion of the machine. The jack member 20 is moved upwardly from its loading station illustrated in FIG. 1 to an operating station determined by the engagement of the insole on the last bottom with the arresting member 16 by the operation of a piston (not shown) mounted in a cylinder secured to the base portion of the channel structure 28.

The illustrated last pin 10 extends upwardly from a block 34 which is rectangular in cross section and as shown in FIGS. 1 and 3 is supported for angular movement on a horizontal axis in a trunnion-like structure or slide comprising two spaced walls 36 and 38 extending upwardly from a base 40 (FIG. 4) and providing means for mounting a horizontal trunnion shaft 42 extending generally lengthwise of a last mounted on the last pin 10. To provide for adjustive movement of the trunnion assembly widthwise of a last on the last pin 10 said assembly has a downwardly extending tongue 44 which is mounted for sliding movement in a suitable groove 46 formed in the upper end portion of the jack member 20. Referring to FIG. 3 angular movement of the last pin assembly on the trunnion shaft 42 is limited by two headed screws 48 mounted in the base portion 40 of the trunnion assembly and arranged to restrict the movement of a stem 50 projecting downwardly from the block 34 into a bore 52 in the tongue 44. If desired the screws 48 may be turned tightly against the stem 50 in order to hold the last pin against angular movement upon the trunnion shaft 42. For limiting the horizontal movement of the trunnion assembly in the groove 46 a headed screw 54 is mounted in the forward portion of the jack 20 at its upper extremity and arranged to extend rearwardly into a suitable recess or notch (not shown) formed in the tongue 44, the width of said recess determining the extent of horizontal movement afforded the last pin assembly.

During an initial stage of the upward movement of the jack 20 the last positioning horn 14 moves upwardly in unison with the jack. During this first stage of the upward movement of the jack mechanism means now to be described locks the last pin assembly against horizontal movement in the groove 46 in the upper portion of the jack. Secured in a suitable groove extended longitudinally of the base of the tongue 44 is a ratchet bar 56 which is engaged by a pawl 58 during the first stage of the upward movement of the jack. Referring to FIGS. 1 and 3 the pawl is pivotally mounted on a headed screw 60 mounted in the left side portion of the jack. The pawl 58 has an outwardly extending arm 62 having formed therein an open ended slot 64. The arm 62 is received within the bifurcated upper end portion of a vertical shaft 66 slidably mounted in a suitable bore 68 in the hollow head 22. Referring to FIG. 1 a cross pin 70 in the bifurcated upper end portion of the shaft 66 extends through the open ended slot 64 in the arm 62 and provides a connection whereby the sliding movement of the shaft 66 causes angular movement of the pawl 58. Referring to FIG. 3 a stem 72 extends downwardly from the shaft 66 and is surrounded by a spring 74 which is confined between the base of the shaft 66 and a washer 76 supported upon a nut 78 mounted on the threaded lower end portion of the stem 72. Expansion of the spring 74 moves the shaft 66 downwardly thereby to swing the pawl 58 in a counterclockwise direction as seen in FIG. 1 into ratchet engaging position. During the downward movement of the jack into its loading station illustrated in FIG. 1 the lower end of the stem 72 engages the channel structure 28 and further movement of the jack thereafter causes the pawl 58 to swing in a clockwise direction as seen in FIG. 1 out of ratchet engaging position thereby to release the last pin assembly for horizontal movement longitudinally of the groove 46.

Referring to FIG. 4 the last positioning horn 14 is illustrated as a pair of forwardly and upwardly diverging wings 80 mounted on a base plate 82. Referring to FIG. 1 the base plate is provided with a downwardly extending tongue 84 slidably mounted in a transverse groove 86 formed in a head 88 at the upper extremity of a vertical stem 90. For clamping the base plate in adjusted relation to the head 88 a clamping screw 110 extends through a slot in the head 88 at the base of the groove 86 and into a tapped bore in the base plate 82. The stem 90 is axially mounted in a cylinder 92 which in turn is mounted for vertical sliding movement in a bearing in the hollow head 22. The stem has an upper bearing in a cap plate 94 mounted at the upper extremity of the cylinder 92 and a lower bearing in a sleeve 96 mounted in the lower portion of the cylinder 92. For holding the cylinder 92 against rotation in its bearing in the hollow head 22 a plate 98 is secured to the lower extremity of the cylinder and extends rearwardly therefrom, its bifurcated rear end portion embracing a standard 100 secured to the frame member 32. For holding the stem 90 against rotation relatively to the cylinder 92 a cross pin 102 is mounted in the stem and extends outwardly into vertical slots 104 formed in the cylinder 92. The horn assembly is yieldingly supported within the cylinder 92 upon a spring 106 surrounding the stem and confined between the cross pin 102 and the upper extremity of the sleeve 96. During the upward movement of the jack the horn assembly is held against upward movement by a spring 108 until the upper portion of the head 22 engages the lower extremity of the base plate 82 and causes the horn assembly to move upwardly with the jack. The spring 108 surrounds the lower portion of the cylinder 92 and is confined between the bottom surface of the head 22 and the plate 98. The downward displacement of the horn assembly relatively to a last on the last pin 10 during the initial upward movement of the jack is sufficient to provide clearance for the subsequent advancement of a heel band hereinafter described into heel embracing position.

To assist the operator in positioning the back seam portion of a shoe upper on a last mounted on the last pin 10 a mirror 111 is mounted on an inclined upper surface of the standard 100.

The foot 16 (FIG. 1) which arrests the upward movement of the last is mounted on a stem 112 depending from a vertical shaft 114 the lower end of which is threaded to receive a knurled nut 116 and the upper portion of which is axially bored to receive a spring 118. The shaft 114 is slidably mounted in a vertical bore in a supporting head 120 secured by headed screws 122 to outwardly extending flanges 124 at the forward extremity of a goose neck 126 forming the upper portion of the frame member 32. The spring 118 is confined between a cross pin 128 mounted in the head 120 and an upper cross pin 130 mounted in the shaft 114. The cross pin 128 extends through vertical slots 132 formed in the hollow portion of the shaft 114. Thus it will be seen that the spring 118 urges the shaft upwardly into its position illustrated in FIG. 1 in which the knurled nut 116 bears against the lower extremity of the head 120 and further that the shaft is held against rotation in the head 120 by the engagement of the cross pin 128 in the slots 132. The vertical position of the foot 16 is conveniently adjustable by rotating the knurled nut 116 on the threaded lower portion of the shaft 114.

The insole holddown member 18 is illustrated as an angle plate the horizontal portion of which engages the margin at the extremity of the heel portion of an insole on a last bottom and the vertical portion of which is secured by a headed screw 134 to the forward portion of a sleeve 136 slidably mounted on the lower portion of a stem 138. Referring to FIG. 2 the reduced upper end portion of the stem 138 extends through a vertical bore in a block 140 pivotally mounted on a cross pin 142 carried in the bifurcated end portion of an arm 144. Mounted on the upper end portion of the stem 138 and seated upon the upper surface of the block 140 is an angle arm 146 which is clamped against the block 140 by a nut 148 on the threaded upper end portion of the stem. The holddown assembly is normally held in its vertical position illustrated in FIGS. 1 and 2 by a spring 150 the upper end of which is anchored to an extension of the arm 146 and the lower end to a pin 154 in the arm 144. The holddown member 18 is urged downwardly by a spring 156 surrounding the stem 138 into position illustrated in FIG. 1, said position being determined by a cross pin 158 mounted in the stem and extending outwardly from the stem through vertical slots 160 formed in the sleeve 136. To provide for horizontal adjustment of the holddown member 18 toward and from the foot 16 the arm 144 is mounted for adjustive movement in the head 120. Referring to FIG. 5 the arm 144 is positioned between parallel horizontal bars 162 and secured thereto by headed screws 164. At their left end portions the bars 162 are secured by headed screws 166 to a cross head 168. The bars 162 are slidably mounted for adjustive movement in horizontal grooves 170 formed in opposite sides of the head 120. For adjusting the holddown assembly to the left as seen in FIG. 5 a knurled headed adjusting screw 172 is threaded through a tapped hole in the cross head 168 and seated in a socket 174 in the head 120. For adjusting the holddown assembly to the right as seen in FIG. 5 a compression spring 176 is positioned between the arm 144 and the head 120 and mounted in suitable sockets formed in said members. The spring 176 adjusts the holddown assembly to the right upon retraction of the adjusting screw 172.

For shaping or molding the heel end portions of the upper materials on a last mounted on the last pin 10 there is provided a heel band 178 which is similar in its construction and operation to the heel band organization illustrated and described in the Becker Patent No. 3,138,-810 hereinbefore referred to. The illustrated heel band is molded of any suitable plastic material, such for example as rubber, the inner surface of the band having a contour generally complemental to the contour of the heel end portion of the last and the outer surface being arcuate in shape at its rear end and having plane side faces tangential to the arcuate end portion. To provide for the attachment of the heel band to a pair of arms 180 the opposite end portions of the band have flanges 182 extending forwardly and outwardly therefrom. The arms 180 are arranged in contiguous relation to the bottom surface of a heel band carriage 184 and are maintained in this position by inserting their rear end portions between the bottom of the carriage and the upper surfaces of lugs 186 extending forwardly from bosses 188 formed in the base of the carriage 184. To provide for the pivotal mounting of the arms 180 each arm is drilled at its rear end portion to receive a pin 190 extending through a bore in the lugs 186 and into a socket in the carriage 184, a suitable cotter pin 192 being provided to hold the pin against displacement. The flanges 182 at the forward extremities of the heel band are secured by headed screws 194 to swivel blocks 196 carried at the forward extremities of the arms 180 respectively. The screws extend through washers 198 and through suitable apertures in the flanges 182 and into threaded sockets provided in the swivel blocks 196. Each swivel block is seated against a flange 200 extending outwardly from a screw 202 mounted in the forward portion of the arm 180 and is held against the flange by a spring clip 204 mounted in a peripheral groove in the head of the screw. The screw is secured in adjusted position in the arm 180 by a knurled cylindrical lock nut 206 mounted thereon and arranged to engage the forward end of the arm 180. Embracing the heel band is a backing assembly comprising two sections of chain 208, a centrally located headed pin 210 in which the rear end portions of the chain sections are anchored, two side members, herein illustrated as rectilinear plates 212 arranged at opposite sides of the heel band and anchored to the forward portions of the chain sections and two short lengths of chain 214 connecting the forward portions of the plates 212 to the swivel blocks 196. The pin 210 is slidably mounted in a bore formed in a boss 216 extending from the carriage 184, the axis of the bore extending longitudinally of the heel band and being centrally located widthwise of the carriage. The two chain sections 208 bear against a thin sheet of flexible material 218 such for example as grain leather which surrounds the arcuate rear end face of the heel band and is separated from the heel band by a thin flexible metal sheet 220. In the operation of the machine the chain sections 208 embed themselves in the leather sheet 218 and the plates 212 are arranged in contiguous relation to the outer surfaces of the opposite side portions of the heel band.

For wiping the lasting margins of the shoe upper materials at the heel end of the upper inwardly over an insole on the last bottom the illustrated machine is provided with a lasting organization generally similar to that illustrated and described in the Becker Patent No. 3,138,810 hereinbefore referred to. Referring to FIG. 7, the lasting organization comprises two wiper plates 222 and 224 for overwiping the curved extremity of the heel portions of the upper materials and two rectilinear wiper plates 226 and 228 for overwiping opposite sides of the heel end portions of the upper materials. In the operation of the machine the wipers 222 and 224 advance toewardly while swinging toward each other over the margin of the insole. The rectilinear wiper plates 226 and 228 move inwardly over the insole with little, if any, movement lengthwise of the shoe. The operation of the wipers 222 and 224 at the relatively sharply curved portions of the heel end of the insole causes the occurrence of pleats in the lasting margins of the shoe upper materials and the increase in thickness of marginal materials resulting from the occurrence of such pleats causes the wipers 222 and 224 to operate in a plane slightly higher than the plane of the overwiped margin at the relatively straight side portions of the heel section of the insole. Thus it will be seen that the rectilinear wiper members 226 and 228 in order to apply adequate wiping pressure to the marginal materials at the opposite sides of the heel portions of the insole should be constructed and arranged to operate at a level slightly lower than the plane of operation of the wipers 222 and 224. To this end the forward portions of the rectilinear wiper plates 226 and 228 are provided with wiper elements 230 (FIG. 8). Each of these elements comprises a relatively thick plate or carrier 232 to which there is secured by rivets 234, a plane section 236 of a resilient plate having a wiping section 238 extending outwardly therefrom. As shown in FIG. 9 the wiping section is bent downwardly from the plane section 236 and its marginal portion is curved upwardly to present a smooth convex surface to the lasting margin of the upper. The resilience of the wiping section 238 of the side wiper permits sufficient vertical movement of the wiper to accommodate any slight variations on the vertical disposition of the wiping plane of the wiper plates 222 and 224 relatively to the wiping plane of the wiper elements 230. Each wiper element 230 is seated in a recess 240 formed in the bottom surface of the rectilinear wiper plate, the depth of the recess corresponding to the overall thickness of the wiper element and the width of the recess corresponding to the width of the wiper element. The wiper element is positioned within the recess by a tongue 242 projecting from the base of the recess into a suitable groove formed in the plate 232. To provide for longitudinal adjustment of each wiper element 230 relatively to the rectilinear wiper in which it is mounted the rectilinear wiper is provided with a longitudinal slot 244 through which extends a headed clamping screw 246 which is received in a tapped bore provided in the plate 226.

The two wiper plates 222 and 224 are secured to overlying wiper carriers 248 and are supported upon a cam plate 250 which is fixed to the base 252 of a wiper carriage. The rectilinear wiper plates 226 and 228 are confined vertically between the wiper carriers 248 and the cam plate 250 but do not receive rectilinear movement from the carriers. As shown in FIG. 7 each rectilinear wiper is slidably mounted between the edge face 254 of one of the wipers 222, 224 and the parallel edge face 256 of a land 258 on the bottom surface of the wiper carrier 248. Thus it will be seen that the rectilinear wipers move toward and from each other in unison with the closing and opening movements of the wipers 222 and 224. During their movements toward and from each other, the position of the rectilinear wipers longitudinally thereof is determined by the engagement of a roll 260 carried by the rear end portion of the wiper in a slot 262 formed in the cam plate 250. The wipers are actuated by a power operated slide 264 mounted in suitable grooves in the side walls of the carriage 252. The slide 264 has forwardly converging cam slots 266 within which are received cam rolls 268 pivotally mounted on the rear portions of the wiper carriers 248 respectively. A second cam roll underlying and coaxial with the cam roll 268 traverses a slot 270 in a cam plate fixed to the base of the carriage and causes angular movement of the wiper carrier during its advancement. A cover plate 272 secured to the side walls of the carriage overlies the wiper assembly and takes the upward force exerted against the wipers in the overwiping operation.

Having thus described our invention, what we claim as new and desire to secure by Letters Patent of the United States is:

1. In a machine for shaping shoe upper materials upon a last, a jack having at its upper extremity a slide movable widthwise only of a last in the machine, a last pin mounted in the slide for angular movement on an axis extending generally lengthwise of the heel portion of a last on the last pin, and means rendered operative by movement of the jack in one direction heightwise of a last on the last pin for preventing movement of the slide relatively to the jack and means rendered operative by movement of the jack in the opposite direction for disengaging said preventing means from the slide thereby to free the slide for movement relatively to the jack.

2. In a machine for shaping shoe upper materials upon a last, a jack, a slide mounted in the jack for movement transversely of a last in the machine, a last pin carried by the slide and arranged to receive a shoe last in inverted position, a detent for holding the slide against movement relatively to the jack, said detent being mounted on the jack for movement between an operative position and an inoperative position, means rendered operative by movement of the jack in one direction for causing the advancement of the detent into its operative position and means rendered operative by movement of the jack in the opposite direction for causing movement of the detent from its operative position into its inoperative position.

3. In a machine for shaping shoe upper materials upon a last, a last supporting jack, means mounting the jack for movement to transfer a last thereon between a loading station and an operating station, a slide mounted in the jack for movement transversely of a last supported thereby, a last pin carried by the slide and arranged to mount a last in inverted position, means for locking the slide against movement relatively to the jack, means rendered operative by movement of the jack from the loading station to the operating station to cause the locking means to be advanced into locking position and means rendered operative by movement of the jack from the operating station toward the loading station for causing the retraction of the locking means into its inoperative position.

4. In a machine for shaping shoe upper materials upon a last, a last supporting jack, means mounting the jack for movement to transfer a last thereon between a loading station and an operating station, a slide mounted in the jack for movement transversely of a last supported thereby, a last pin carried by the slide and arranged to mount a last in inverted position, a detent for locking the slide against movement relatively to the jack, a rigid member connected to the detent and rendered operative by its engagement with a fixed part of the machine during return movement of the jack to the loading station to cause the retraction of the detent from its locking position and a spring rendered operative by movement of the jack from the loading station toward the operating station to advance the detent into its locking position.

5. In a machine for shaping shoe upper materials upon a last, a jack having at its upper extremity a slide movable widthwise only of a last in the machine, a frame section in which the jack is slidably mounted for movement to transfer a last thereon between a loading station and an operating station, a last pin mounted in the slide and arranged to mount a last in inverted position, a detent for locking the slide against movement relatively to the jack, a shaft slidably mounted in the frame section and connected at one end to the detent, the other end being arranged in abutting relation to a fixed part of the machine, a spring which acts on the shaft during movement of the jack from the loading station toward the operating station to advance the detent into locking position, said shaft being operable during movement of the jack toward the loading station by engagement thereof with said fixed machine part to cause retraction of the detent from its locking position.

6. In a machine for shaping shoe upper materials upon a last, a jack having at its upper extremity a last pin for mounting a last with shoe upper materials assembled thereon in inverted position, a last locating member for engaging the upper materials at the extremity of the heel portion of a last on the last pin thereby to determine the orientation of the last and means mounting said member for movement between an operating position and a position in which it is offset from the last to permit the advancement of an operating instrumentality into engagement with the heel portion of a shoe upper on a last mounted on the last pin.

7. In a machine for shaping shoe upper materials upon a last, a jack having at its upper extremity a last pin for mounting a last with shoe upper materials assembled thereon in inverted position, a horn for engaging the upper materials at the extremity of the heel portion of a last on the last pin thereby to determine the orientation of the last and means mounting the horn for movement to transfer the horn between an operating position and a position in which it is offset from a last on the last pin to afford clearance for the operation of means for shaping the heel portion of an upper upon a last mounted on the last pin.

8. In a machine for shaping shoe upper materials upon a last, a jack having at its upper extremity a last pin for mounting a last with shoe upper materials assembled thereon in inverted position, a horn for engaging the upper materials at the extremity of the heel portion of a last on the last pin thereby to determine the orientation of the last, a head on which the horn is mounted for adjustive movement widthwise of a last on the last pin and means mounting the head for movement heightwise of the last to transfer the horn between an operating position and a position in which it is offset from a last on the last pin to afford clearance for the operation of means for shaping the heel portion of an upper upon a last mounted on the last pin.

9. In a machine for shaping shoe upper materials upon a last, a jack having at its upper extremity a last pin for mounting a last with shoe upper materials assembled thereon in inverted position, a horn for engaging the upper materials at the extremity of the heel portion of a last on the last pin thereby to determine the orientation of the last, a head on which the horn is mounted for adjustive movement widthwise of a last on the last pin, a stem depending from the head into a hollow supporting member, means for urging the stem heightwise of the last into engagement with its heel end portion and means for urging the supporting member heightwise of the last in a direction to transfer the horn from its operating position to an offset position affording clearance for the operation of a heel band.

10. In a machine for shaping shoe upper materials upon a last, a jack having at its upper extremity a last pin for mounting a last with shoe upper materials assembled thereon in inverted position, a horn for engaging the upper materials at the extremity of the heel portion of a last on the last pin thereby to determine the orientation of the last, a head on which the horn is mounted for adjustive movement widthwise of a last on the last pin, a stem depending from the head into a hollow supporting member, means for urging the stem heightwise of the last thereby to press the horn against the heel end portion of the last, and means for urging the supporting member heightwise of the last in a direction to transfer the horn from its operating position to an offset position affording clearance for the operation of a heel band, means mounting the jack for movement heightwise of a last on the last pin between a loading station and an operating station, means mounting the hollow supporting member on the jack for movement relatively thereto heightwise of the last, and means for arresting movement of the hollow supporting member during movement of the jack into its loading station thereby to cause the horn to be located in its operating position.

11. In a machine for shaping shoe upper materials upon a last, a jack having at its upper extremity a last pin for mounting a last with shoe upper materials assembled thereon in inverted position, a horn for engaging the upper materials at the extremity of the heel portion of a last on the last pin thereby to determine the orientation of the last, a head on which the horn is mounted for adjustive movement widthwise of a last on the last pin, a stem depending from the head, a cylinder within which the stem is received and supported, means within the cylinder for urging the stem heightwise of the last thereby to urge the horn into engagement with the heel end portion of the last, means for urging the cylinder heightwise of the last in a direction to transfer the horn from its operating position to an offset position affording clearance for the operation of a heel band, and means carried by the jack for mounting the cylinder for movements heightwise of the last.

12. In a machine for shaping shoe upper parts upon a last, a jack having at its upper extremity a last pin for mounting a shoe last in inverted position, means mounting the jack for movement heightwise of a last on the last pin between a loading station and an operating station, means in the operating station for positively arresting such movement of the jack, means in the operating station for yieldingly pressing against the bottom of the last an insole mounted thereon, lasting means, and means mounting the insole pressing means for displacement by the lasting means during its operating movement.

13. In a machine for shaping shoe upper parts upon a last, a jack having at its upper extremity a last pin for mounting a shoe last in inverted position, means mounting the jack for movement heightwise of a last on the last pin between a loading station and an operating station, means in the operating station for positively arresting such movement of the jack, means in the operating station for yieldingly pressing against the bottom of the last an insole mounted thereon, lasting means, means mounting the insole pressing means for displacement by the lasting means during its operating movement, and means for adjusting the insole pressing means relatively to the jack arresting means lengthwise of the last.

14. In a shoe machine, wipers for overwiping the heel end portions of shoe upper materials upon an insole on a last bottom, a jack, a last pin carried by the jack for mounting a last with shoe upper materials assembled thereon in inverted position, means mounting the jack for movement heightwise of a last on the last pin between a loading station and an operating station, means in the operating station for arresting such movement of the jack, a fixture in which the arresting means is mounted, a presser for resiliently pressing the margin of an insole against the last bottom, an arm mounted in the fixture, means whereby the presser is mounted on the arm so as to permit displacement thereof by the wipers during their operating movement and means for adjusting the arm lengthwise of the last relatively to the jack arresting means.

15. In a shoe machine, wipers for overwiping the heel end portions of shoe upper materials upon an insole on a last bottom, a jack having at its upper extremity a slide movable widthwise only of a last in the machine, a last pin mounted in the slide for angular movement on an axis extending generally lengthwise of the heel portion of a last on the last pin, means rendered operative by movement of the jack in one direction heightwise of the last for preventing movement of the slide relatively to the jack, means mounting the jack for movement heightwise of the last between a loading station and an operating station, a last locating member which engages the extremity of the upper materials at the heel portion of the last thereby to determine the orientation thereof, means mounting said locating member for movement between an operating position and a position in which it is offset from the last to permit the advancement of an operating instrumentality into engagement with the heel portion of an upper on the last, means in the operating station for positively arresting movement of the jack heightwise of the last, means in the operating station for yieldingly pressing against the bottom of the last an insole mounted thereon, and means mounting the insole pressing means for displacement by the wipers during their operating movements.

16. In a machine for shaping shoe upper materials upon a last, means for supporting a last having shoe upper parts assembled thereon, a heel band having a curved extremity and rectilinear side portions for shaping heel end portions of the shoe upper parts upon the last, a carriage for the heel band, a pair of swinging arms diverging from the carriage, means for attaching the opposite ends of the heel band to the arms and backing means for the heel band comprising flexible elements arranged in contiguous relation to the curved extremity of the heel band, inflexible elements connected to the flexible elements and arranged in contiguous relation to the rectilinear side portions of the heel band and flexible connections between the inflexible elements and the swinging arms.

17. In a machine for shaping shoe upper parts upon a last, a jack having at its upper extremity a slide movable widthwise only of the machine, a last pin mounted in the slide for angular movement on an axis extending generally lengthwise of a heel portion of a last on the last pin, means rendered operative by movement of the jack heightwise of the last for preventing movement of the slide relatively to the jack and thus securing the last against movement widthwise thereof preparatory to an upper shaping operation, a heel band for shaping the heel portions of the upper parts on the last, said heel band having a curved end portion and rectilinear side portions, a carriage for advancing the heel band into position to embrace the heel portions of the shoe upper parts on the last, a pair of swinging arms mounted in the carriage and connected to the extremities of the heel band and backing means for the heel band comprising a flexible section arranged in contiguous relation to the curved end portion of the heel band and two inflexible sections extending along the rectilinear side portions of the heel band and arranged in contiguous relation thereto.

18. In a machine for shaping shoe upper parts upon a last, a jack having at its upper extremity a slide movable widthwise only of the machine, a last pin mounted in the slide for angular movement on an axis extending generally lengthwise of a heel portion of a last on the last pin, means rendered operative by movement of the jack heightwise of the last for preventing movement of the slide relatively to the jack and thus securing the last on the last pin against movement widthwise thereof preparatory to operations on the heel end portions of the shoe upper parts, means for shaping the heel portions of the shoe upper parts upon the last and means for wiping lasting margins of the heel portions of the shoe upper ports over an insole on the last bottom comprising a pair of end wipers mutually articulated for relative angular movements, a pair of carriers for the end wipers, means mounting the carriers for movements bodily lengthwise of the last and for relative angular movements, a pair of rectilinear side wipers mounted on the carriers, means substantially restraining the side wipers against movements lengthwise of the last and resilient wiper plates incorporated in the side wipers and arranged to operate in a plane offset heightwise of the last from the plane of operation of the end wipers.

19. In a machine for shaping shoe upper parts upon a last, a jack having at its upper extremity a slide movable widthwise only of a last in the machine, a last pin mounted in the slide for angular movement on an axis extending generally lengthwise of a heel portion of the last, means rendered operative by movement of the jack heightwise of the last for preventing movement of the slide relatively to the jack and thus securing the last against movement widthwise thereof preparatory to operations on the heel end portions of the shoe upper parts, means for shaping the heel portions of the shoe upper parts upon the last, means for wiping lasting margins of the heel portions of the upper parts over an insole on the last bottom comprising a pair of end wipers mutually articulated for relative angular movements, a pair of carriers for the end wipers, means mounting the carriers for movements bodily lengthwise of the last and for relative angular movements, a pair of rectilinear side wipers mounted on the carriers, means substantially restraining the side wipers against movements lengthwise of the last and resilient wiper plates incorporated in the side wipers and arranged to operate in a plane offset heightwise of the last from the plane of operation of the end wipers, and means for determining the position of the last for the operation of the end wipers comprising means in the operating station for positively arresting movement of the jack heightwise of the last, means in the operating station for yieldingly pressing against the bottom of the last an insole mounted thereon and means mounting the insole pressing means for displacement by the end wipers during their overwiping movements.

20. In a machine for shaping shoe upper materials upon a last, a jack having at its upper extremity a slide movable widthwise only of a last in the machine, a last pin mounted in the slide for angular movement on an axis extending generally lengthwise of a heel portion of the last, means rendered operative by movement of the jack heightwise of the last for preventing movement of the slide relatively to the jack and thus securing the last against movement widthwise thereof preparatory to operations on the heel end portions of the shoe upper parts, a heel band for shaping the heel portions of the shoe upper parts upon the last, means for wiping lasting margins of the heel portions of the upper parts over an insole on the last bottom comprising a pair of end wipers mutually articulated for relative angular movements, a pair of carriers for the end wipers, means mounting the carriers for movements bodily lengthwise of the last and for relative angular movements, a pair of rectilinear side wipers mounted on the carriers, means substantially restraining the side wipers against movements lengthwise of the last, resilient wiper plates incorporated in the side wipers and arranged to operate in a plane offset heightwise of the last from the plane of operation of the end wipers, and means for orienting the last for the operations on the heel portions of the shoe upper parts comprising a horn for engaging the upper materials at the extremity of the heel portion of the last and means mounting the horn for movement to transfer it between an operating position and a position in which it is offset from the last to afford clearance for the operation of the heel band.

References Cited by the Examiner

UNITED STATES PATENTS

| 1,303,847 | 5/1919 | Brock | 12—12 |
| 2,078,577 | 4/1937 | Lawson | 12—126 |
| 2,869,155 | 1/1959 | Finn | 12—12 X |
| 3,082,449 | 3/1963 | Bowler et al. | 12—12 |
| 3,138,810 | 6/1964 | Becker | 12—12.3 |

JORDAN FRANKLIN, *Primary Examiner.*